United States Patent [19]
Kellow et al.

[11] Patent Number: 5,217,064
[45] Date of Patent: Jun. 8, 1993

[54] TEMPERATURE CONTROLLED PHARMACEUTICAL STORAGE DEVICE WITH ALARM DETECTION AND INDICATION MEANS

[75] Inventors: Robert C. Kellow, P.O. Box 528, Alvarado, Tex. 76009; Royce L. Rote, Arlington, Tex.

[73] Assignee: Robert C. Kellow, Alvarado, Tex.

[21] Appl. No.: 788,097

[22] Filed: Nov. 5, 1991

[51] Int. Cl.$^5$ ............................................. F25B 25/00
[52] U.S. Cl. .................................. 165/48.1; 165/27; 62/3.62; 307/117
[58] Field of Search ................... 165/27, 48.1; 62/3.3, 62/3.62; 307/117

[56] References Cited

U.S. PATENT DOCUMENTS

| | | | |
|---|---|---|---|
| 3,255,812 | 6/1966 | Bayane et al. | 165/48.1 |
| 3,536,132 | 10/1970 | Pecoraro | 165/48.1 |
| 3,713,302 | 1/1973 | Reviel | 62/3.62 |
| 3,858,106 | 12/1974 | Launius | 165/27 |

OTHER PUBLICATIONS

Specification sheets for following sampling of pharmaceuticals: morphine, epinephrine, lasix, nubain, diazepam, glucagon, thiamine hydrochloride, promethazine, and nitrostat.

*Primary Examiner*—A. Michael Chambers
*Attorney, Agent, or Firm*—Geoffrey A. Mantooth

[57] ABSTRACT

A temperature-controlled pharmaceutical device includes a substantially enclosed and thermally insulated structure having at least one port which allows access to an enclosed storage area which has a storage temperature. A thermopile heat exchange unit is provided for heating and cooling the storage area in response to signals provided by temperature sensors and a window detector. The storage area is maintained at a temperature between upper and lower predetermined limits. When these limits are exceeded for a predetermined length of time, a visual display is actuated to warn that the substances should be discarded immediately. After signaling an alarm, the indicator is reset by way of a lock switch. The lock switch discourages unauthorized resetting. An energy saving switching mechanism is provided for overriding the heat exchanger circuitry when the port to the enclosed area is open, preventing unnecessary discharge of the battery pack. A drainage plate is provided in the lower region of the storage area to separate condensate and moisture from the articles stored in the storage device. The electronics, battery pack, and heat exchange unit are modular and designed to be quickly and easily decoupled from the storage device.

21 Claims, 3 Drawing Sheets

TEMPERATURE CONTROLLED PHARMACEUTICAL STORAGE DEVICE WITH ALARM DETECTION AND INDICATION MEANS

BACKGROUND OF THE INVENTION

1. Field of the Invention

The present invention relates generally to storage containers for pharmaceuticals, and specifically to temperature-controlled storage containers for pharmaceuticals.

2. Description of Prior Art

Most pharmaceutical substances, such as epinephrine, diazepam, and naloxone are temperature sensitive, and will undergo chemical alteration, will lose potency or have a diminished shelf life if exposed to temperatures over or under the manufacturers' required temperature storage range. This temperature storage range is typically 15-30 degrees Celsius (59-86 degrees Fahrenheit) and is described by the *U. S. Pharmacopoeia* as "room temperature".

The danger of administering a drug that has been chemically altered or that has lost potency is that the drug will not have the anticipated efficacy. A paramedic who is ignorant of the condition of a temperature affected drug may use it in a life threatening situation, relying on the drug to save the patient's life. Some pharmaceutical substances can even become toxic if exposed to high or low temperatures.

In hospital environments wherein the temperature is controlled, pharmaceuticals are easily maintained within the required temperature range. But in pre-hospital situations, such as are found on ambulances and helicopters, pharmaceuticals are commonly exposed to temperatures outside of the required temperature range. There are 23 common pharmaceuticals that are carried by paramedics nationwide. These and other pharmaceuticals that are carried by paramedics are required to be maintained at room temperature. However, these pharmaceuticals are exposed to temperatures in excess of 100 degrees in the summertime in southern and southwestern locations and to subfreezing temperatures in northern locations. Thus, the temperature requirement for pre-hospital pharmaceuticals has long been overlooked and even ignored.

Each year, some 20 million people are cared for in a pre-hospital setting (such as by paramedics). Of these, about 5 million people, according to industry estimates, are provided with advanced life support in an effort to prevent death. The advanced life support includes the administration of pharmaceuticals. Thus, each year millions of people are exposed to the hazards of pharmaceuticals that have been exposed to temperature extremes.

Besides loss of pharmaceutical efficacy, administering drugs that are too hot or cold can cause severe metabolic harm in emergency medical patients. For example, in the winter, paramedics are frequently faced with the problem of administering cold solutions intravenously. Such practices could send the patient into hypothermic shock, resulting in death. Thus, there is a real need to maintain temperature sensitive pharmaceutical and diagnostic substances within the required temperature range.

In the prior art, there is Launius, U.S. Pat. No. 3,858,106. Launius provides a battery powered system for maintaining insulin within the refrigerated temperature range of 40-55 degrees Fahrenheit. This is below room temperature range. Paramedics do not typically carry insulin when providing pre-hospital care. They carry sugar instead. Because the Launius apparatus is battery powered, it is possible for loss of power to occur, thereby resulting in an inability to maintain the designated temperature range and undermining the potency or shelf life of the pharmaceutical substance. For example, the battery can be drained if any door or port to the storage device is inadvertently left ajar. Launius does not provide any mechanism to warn of such problems.

The physicians, nurses and allied health personnel charged with transporting and using pharmaceutical or diagnostic substances have no way of evaluating if the pharmaceutical or diagnostic substance has been permanently damaged, short of expensive chemical testing. This is particularly true where the substances are carried on board ambulances, helicopters or other mobile units. For purposes of this application, the term "pharmaceutical substance" includes diagnostic substances as well as pharmaceutical substances.

Devastating legal liabilities can be incurred if a physician, nurse or medical technician administers pharmaceuticals that have a diminished or lost efficacy. Known temperature-controlled pharmaceutical storage devices offer the physician, nurse or medical technician no assistance in detecting and preventing such an error.

It is one objective of the present invention to provide a temperature-controlled pharmaceutical storage device which maintains pharmaceutical substances between required room temperature (15-30 degrees Celsius) boundaries, and which detects and warns when temperature violations have occurred which have possibly diminished the efficacy of the pharmaceutical substance.

It is another object of the preferred embodiment to provide a temperature controlled pharmaceutical storage device which prevents the unauthorized resetting of the temperature violation indication, provides a backup power supply to power the indicator and provides impact protection to the pharmaceutical containers located therein.

It is another objective of the present invention to provide a temperature-controlled pharmaceutical storage device which automatically disables the heating and cooling means when the storage container is opened, to preserve the storage device battery.

It is still another objective of the present invention to provide a temperature-controlled pharmaceutical storage device which includes a means for draining and absorbing condensate resulting from disparate interior and exterior temperatures.

DETAILED DESCRIPTION OF THE INVENTION

Figure 1:
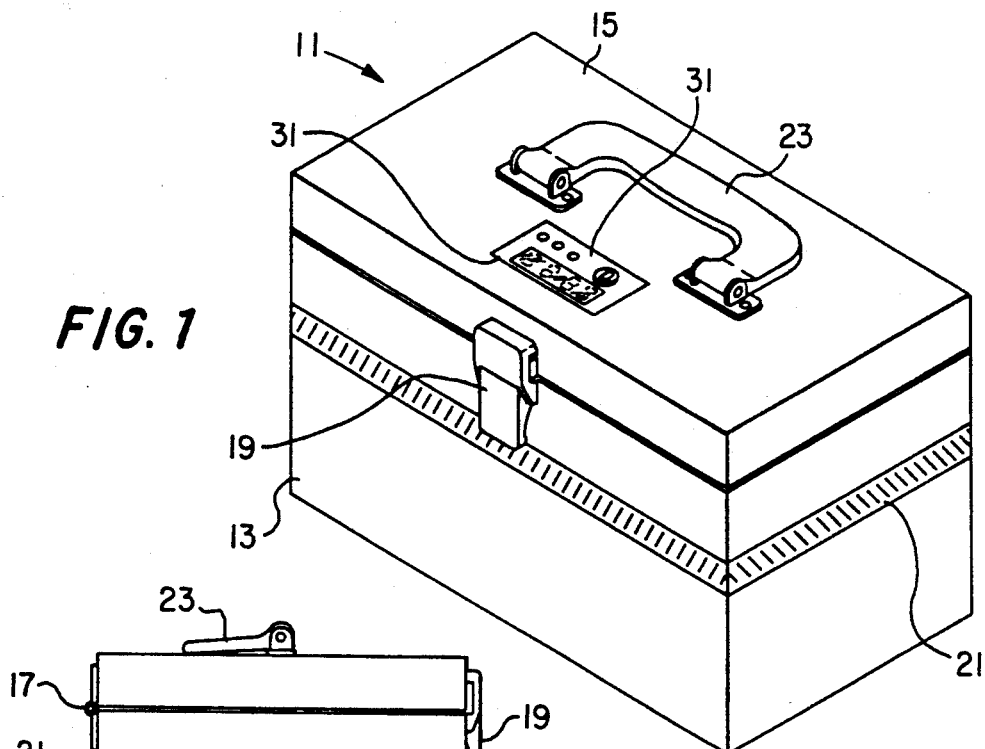
FIG. 1 is an isometric view of the temperature-controlled pharmaceutical storage device of the present invention, in accordance with a preferred embodiment.

FIG. 1 is a perspective view of a temperature-controlled pharmaceutical storage device 11 according to the present invention. Pharmaceutical storage device 11 includes a substantially rectangular storage base 13 with hinged rectangular cover 15 coupled thereto by hinges 17 (see FIG. 2). A latch 19 is provided for securing cover 15 to storage base 13. A band of reflective tape 21 is provided around the exterior of base 13, since the temperature-controlled storage device 11 is intended for use in the field by paramedics, who work along busy roads and highways at all hours of the day and night. Handle 23 is provided for making storage device 11 easy to carry. Both the handle 23 and the latch 19 may be recessed so as to avoid incidental impact. In addition, the exterior corners and edges of the device 11 may be rounded to provide more impact resistance.

Figure 3:
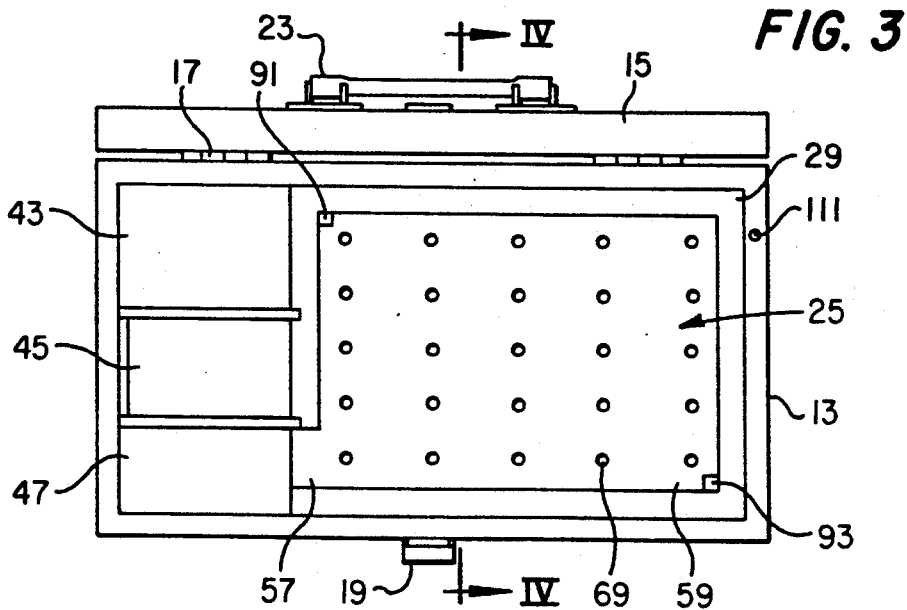
FIG. 3 is a top plan view of the temperature-controlled pharmaceutical storage device of the present invention with its cover open so as to show the interior thereof.
Figure 4:
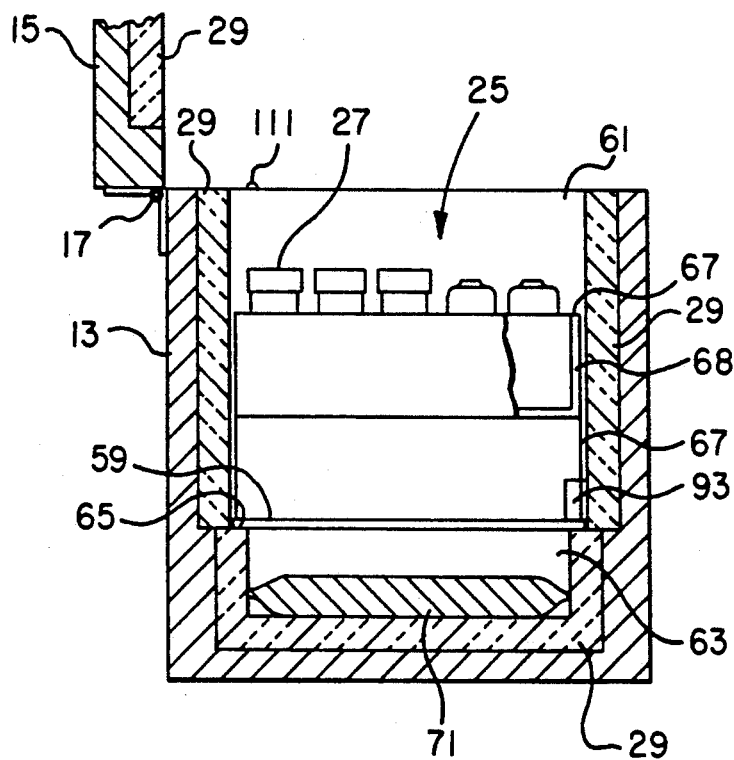
FIG. 4 is a view of FIG. 3 as seen along lines IV—IV.

Referring to FIGS. 3 and 4, the base 13 and cover 15 are made of a hard durable plastic such as ABS for impact resistance. The base 13 has an interior compartment 25 for receiving pharmaceutical containers 27. The containers may be glass vials, plastic bags, etc. and contain such temperature sensitive pharmaceuticals as epinephrine, diazepam and naloxone. Both the interior compartment 25 and the cover 15 are lined with thermal insulation 29 such as polystyrene. Thus, the interior compartment 25 is insulated on all sides, including the top and bottom.

Figure 5:
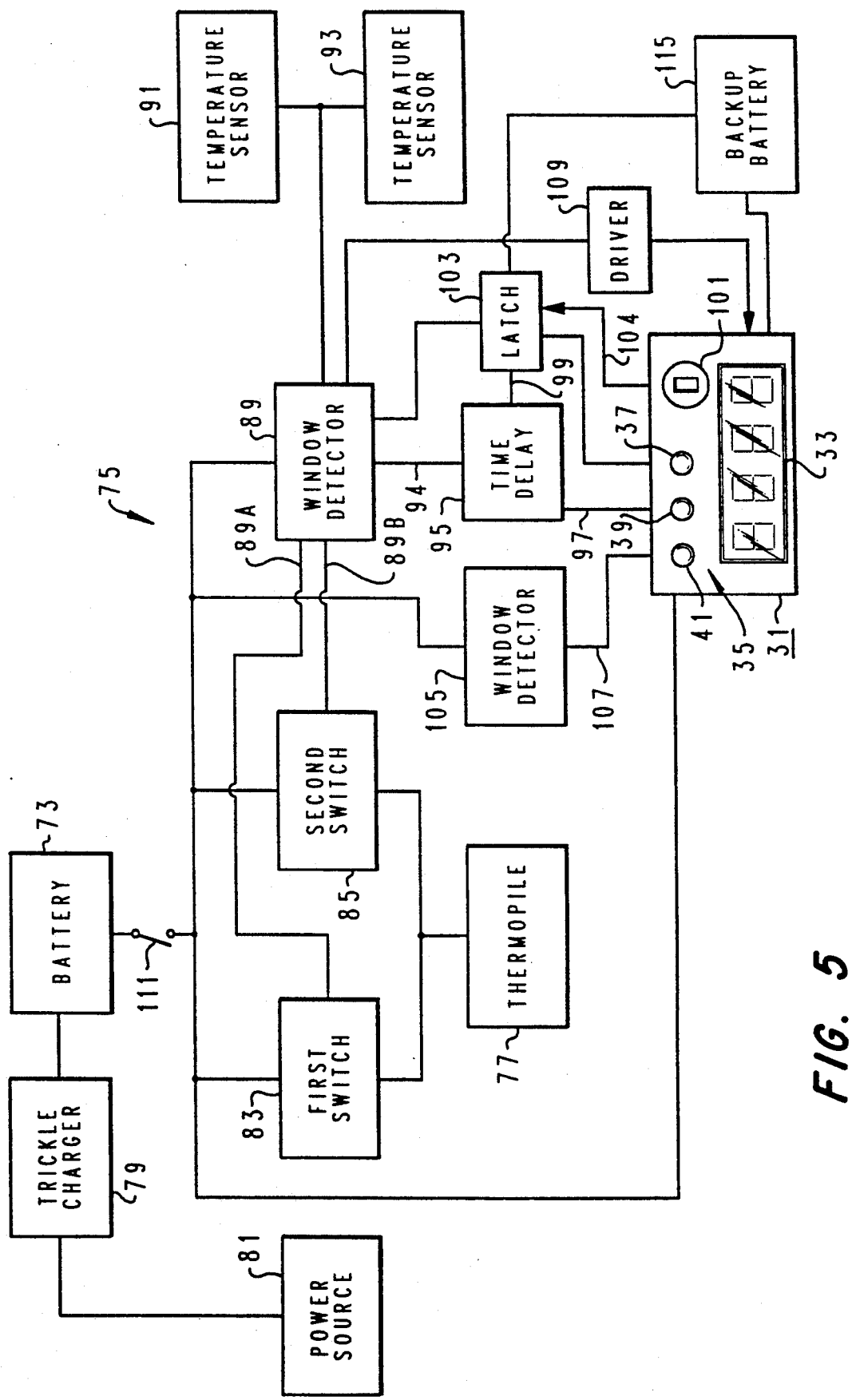
FIG. 5 is a block diagram of the electrical components of the temperature-controlled pharmaceutical storage device of the present invention.

Referring to FIG. 1, electrically actuated visual display 31 is provided on cover 15. Referring to FIG. 5, the display 31 includes seven segment LED display 33 for displaying the temperature within storage device 11, and warning light array 35. Warning light array 35 includes red light 37, green light 39, and yellow light 41. The significance of the various lights of warning light array 35 will be discussed below.

Figure 2:
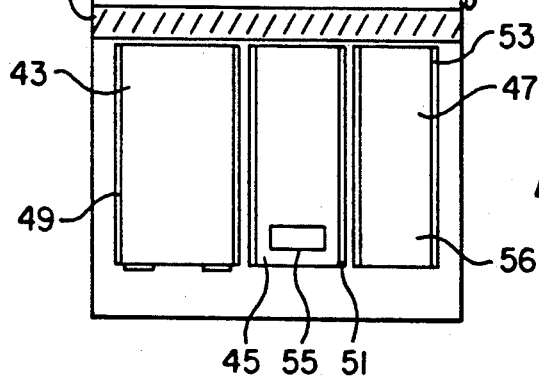
FIG. 2 is a view of one of the sides of the temperature-controlled pharmaceutical storage device of the present invention, showing the battery module, the thermopile module and the electronics module.

As shown in FIGS. 2 and 3, battery module 43, electronics module 45, and heat exchanger module 47 are provided inside of the base 13. The modules are received and retained by respective slots 49, 51, 53. The use of modules allows for ease of interchanging defective components of the storage device. If one module is found to be defective, it is removed from its respective slot. A replacement module is then inserted into the slot. The slots have electrical connectors therein that electrically couple the modules together. Electrical connector 55 is provided in electronics module 45, and allows for the charging of the battery in battery module 43 by way of an external power source. Heat exchanger module 47 includes a flat metal plate 56 on the exterior of the module which plate serves to exchange heat with the ambient air surrounding the container.

FIG. 3 is a top plan view of temperature-controlled storage device 11 of the present invention, with cover 15 open.

The interior compartment 25 communicates with the heat exchanger module 47 through an opening 57 in the insulation. Thus, heat is exchanged between the interior compartment and the heat exchanger module 47 through the opening.

As shown in FIG. 4, a drainage plate 59 divides the interior compartment 25 into upper and lower chambers 61, 63. The upper chamber 61 receives removable trays 67 or bins, which trays contain plural containers 27 of pharmaceuticals. The trays 67 are stacked one on top of another. The trays 67 are provided with padding 68 on their bottoms and sides in order to prevent breakage of the containers 27 whenever the device 11 is subjected to an impact. In addition, the tops of the containers 27 are protected by a layer of padding that is coupled to the overlaying surface. In the lowermost trays, this top layer of padding is coupled to the bottom of the upper trays. In the top tray, the top layer of padding is located on the inside surface of the cover 15.

The drainage plate 59 is supported by a shoulder 65 formed by the insulation. The drainage plate 59 is perforated with multiple openings 69 (see FIG. 3). Likewise, the bottom walls of the trays 67 are perforated. Any condensate which forms on the containers 27 is drained through the perforations into the lower chamber 63. A package 71 of a desiccant material in the lower chamber 63 absorbs the fluid, condensate and humidity. The trays 67 and the drainage plate 59 can be removed from the interior compartment 25 to allow the desiccant package 71 to be changed.

Turning now to FIG. 5, the preferred electronic circuit of the present invention will be described in detail. The electronic circuit includes a battery 73, a control circuit 75, a thermopile circuit 77 and a display 31.

The battery 73 is contained in the battery module 43 and is of the rechargeable type. The battery 73 is recharged through a trickle charger 79 that is located in the electronics module 45. An outside power source 81 is connected to the charger 79 through the d.c. connector 55. The power source 81 can be a rectified a.c. source such as the 120 volt power supply available from common wall receptacles, or it can be the power source on board an ambulance.

The temperature-controlled circuit 75 is located in the electronics module 45 and has first and second switches 83, 85. The switches 83, 85 are connected in parallel to each other and in series with the battery 73 and the thermopile circuit 77. The switches 83, 85 control current flow, and the direction thereof, to the thermopile circuit 77.

The thermopile circuit 77 is located in the heat exchanger module 47 and regulates the heat transfer in and out of the interior compartment 25. The thermopile circuit 77 is made up of plural thermopiles connected together. When the first switch 83 is closed and the second switch 85 is open, current flows in one direction through the thermopiles, causing heat to transfer from the interior compartment through the thermopiles, through the plate 56 and to the ambient air. This results in the interior compartment 25 being cooled. When the second switch 85 is closed, and the first switch is open, current flows in the opposite direction through the thermopiles, causing heat to transfer into the interior compartment 25 from the ambient air. This results in the heating of the interior compartment 25. When both switches are open, no current flows.

The operation of the first and second switches 83, 85 is controlled by a first window detector 89. The first and second switches are connected to respective outputs 89A, 89B on the first window detector 89. First and second temperature sensors 91, 93 are connected to an input of the first window detector 89. The temperature sensors 91, 93 are located in the upper chamber 61 of the interior compartment 25, so as to monitor the temperature therein. The temperature sensors 91, 93 are typically thermistors. The temperature sensors are located in opposite diagonal corners of the interior compartment. Thus, one sensor 91 is located near the cover 15, while the other sensor 93 is located near the drainage plate 59. The provision of two temperature sensors 91, 93 allows for redundancy; if one sensor would fail, there will still be an operating sensor. The first window detector 89 is connected to the battery 73.

The first window detector 89 averages the input from the sensors 91, 93 to determine if the temperature of the interior compartment 25 deviates outside of a predetermined temperature range. In the preferred embodiment, the temperature range is 15-30 degrees Celsius. Most pharmaceutical drugs are required to be maintained within this temperature range, which is commonly referred to as "room" temperature. If the sensed temperature is above the temperature range, the window detector 89 detects this and closes the first switch 83 to cool the interior compartment. The sensors 91, 93 monitor the temperature of the interior compartment. When the temperature of the interior compartment 25 returns to the predetermined temperature range, the window detector opens the first switch 83 to stop the cooling. If the sensed temperature is below the temperature range, the window detector 89 detects this and closes the second switch 85 to heat the interior compartment 25. When the temperature of the interior compartment returns to the predetermined temperature range, the window detector 89 opens the second switch 85 to stop the heating.

There is also provided an alarm circuit for detecting and providing an indication of a violation of the temperature range, which violation could result in damage to the pharmaceuticals inside the container. An output 94 of the window detector 89 is connected to an input of a time delay circuit 95. The time delay circuit 95 has a first output 97 that is connected to the green light 39 in the display 31 and a second output 99 connected to a latch circuit 103.

When the window detector 89 detects a temperature inside of the designated temperature range, the output 94 is at a first level, which causes output 97 to illuminate the green light 39 and output 99 to hold the red light 37 in the off condition. When the temperature is sensed to be outside of the temperature range, the output 94 to the time delay circuit 91 changes to a second level. If the window detector output 94 is maintained at the second level for a predetermined time delay, then the time delay 95 reverses its outputs, so that output 99 now illuminates the red light 37 and the output 97 holds the green light 39 in the off condition. The output 99 is connected to the red light 37 through the latch 103. The output 99 is connected to an input of the latch 103. The output of the latch 103 is connected to the red light 37. The latch 103 maintains the red light 37 in the on condition regardless of the state of the outputs 94, 99. The illuminated red light 37 indicates that the pharmaceuticals located inside of the interior compartment have been subjected to temperature excesses and that these pharmaceuticals should be removed. Replacement pharmaceuticals can then be installed into the trays. The red and green lights provide quick visual indicators to a paramedic of the condition of the pharmaceuticals he is relying on. The time delay 95 is programmed with a predetermined time delay. This time delay determines how long the containers 27 and their contents are exposed to non-room temperatures before triggering the alarm indicator. The length of the time delay depends on the type of pharmaceuticals being carried in the storage device 11. Typically, the time delay will be set for the most temperature sensitive pharmaceutical in the device 11.

Once the red light 37 has been illuminated, it remains so until turned off by a key lock 101. Thus, even if the temperature of the interior compartment 25 returns to the room temperature range, the red light 37 continues to stay lit. The key lock 101, when operated, resets the latch circuit 103. The lock 101 is electrically connected 104 to a reset input of the latch 103. To operate the lock 101 and reset the red light 37, a key must be inserted into the lock 101. The lock 101 prevents the unauthorized tampering of the red light alarm 37. Thus, only someone with authority can reset the display. Resetting the latch circuit 103 resets the alarm indicator 35, wherein the red light 37 goes off and the green light 39 goes on. If the output 94 indicates the temperature to be within the appropriate temperature range, the green light will stay on. If the temperature is outside of the predetermined temperature range, the red light will be relit after the appropriate time delay.

The yellow light 41 indicates the status of the battery 73. The battery 73 is connected to a second window detector 105, which monitors the voltage output of the battery. If the battery voltage falls below a predetermined voltage, then the output 107 of the window detector 105 will light the yellow light. This indicates that the battery needs to be charged by the power source 81.

The display also shows the temperature of the interior compartment 25 with the LED display 33. The LED display 33 is connected to a driver 109, which is connected to an output of the window detector 89. The driver 109 drives the display 33, which numerically shows the temperature.

There is also provided a switch 111 that is connected in series with the battery 73 and the first and second switches 83, 85. The switch 111 is located on the top rim of the base 13 (see FIG. 3). When the cover 15 is closed, the switch 111 is closed and allows the thermopile assembly 77 to be operated. However, when the cover 15 is open, the switch 111 is open, thereby preventing operation of the thermopile. The cutoff switch 111 serves to extend the operating time of the battery 73 by preventing unnecessary operation. This is when the cover is open, the operation of the thermopile is ineffective in maintaining temperature control of the interior compartment.

A backup battery 115 is provided to power the alarm lights 35 in case of the failure of the primary battery 73. The backup battery 115 is connected to the display 31 and to the latch circuit 103. Thus, the warning lights 35 and the latch circuit 103 are protected against power failure. In the preferred embodiment, the battery 115 is a lithium battery.

Figure 6:
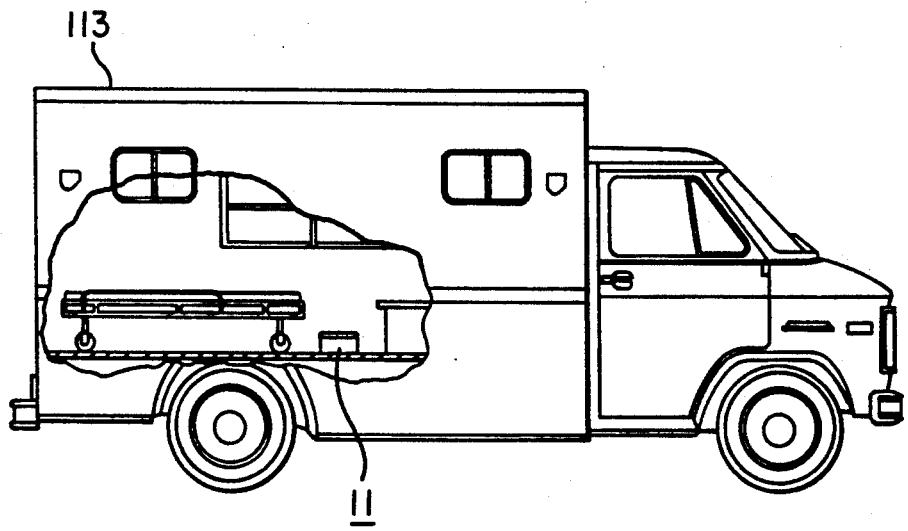
FIG. 6 shows a side view of an ambulance, with a portion cut away to show the interior of the ambulance, with the storage device of the present invention located therein.

The storage device 11 of the present invention can be unattached to any other structure, as shown in FIG. 1, or it can be mounted in an ambulance 113, as shown in FIG. 6. When the device 11 is unattached, a paramedic may pick it up and move it around. When the device 11 is mounted to the ambulance, it is coupled thereto.

The present invention has significant advantages over the prior art devices. The principal advantage is that physicians, nurses and medical technicians need not make assumptions about the potency of substances kept within the temperature sensitive storage device. Thus, the quality of medical care is not compromised. The warning light array provides the physician, nurses or allied health personnel an immediate assessment of whether the substances contained within the structure have been exposed to potentially damaging temperatures. Therefore, substances which are inadvertently exposed to destructively high or low temperatures will be identified at once, and may be replaced immediately. This reduces a significant source of malpractice liability for the physician, nurse and medical technician alike, since the reliance upon the administration of less than potent pharmaceutical substances may result in injury or death to the patient.

The warning light array can be reset from a warning or alarm condition, which indicates that the pharmaceuticals may have been compromised by excess temperatures, to a non-alarm condition. However, a security device is provided to prevent unauthorized resetting. This provides confidence that once an alarm has been indicated, only authorized personnel can reset the device. Under these circumstances, the likelihood that the affected pharmaceuticals will be replaced is increased.

The warning light array is provided with a backup battery to enhance reliability of the system.

Another significant advantage includes the port switching feature which disables the thermopile heat exchanger when the temperature-controlled storage device door is opened. This prevents unnecessary drainage of the battery pack, and prolongs the length of time the unit may be used in the field before recharging.

The drainage plate 55 in the storage device serves to route condensate and other fluids into a drainage bin for absorption by a desiccant packet. This prevents moisture damage to substances and diagnostic equipment which are also moisture sensitive.

Furthermore, the pharmaceutical containers are located in padded trays to reduce impact breakage. Pharmaceuticals frequently are packaged in glass containers. Prior art 747 kits, which are used by paramedics to carry their pharmaceutical supplies, amount to little more than fishing tackle boxes. Paramedics routinely carry 4-5 times the amount of required pharmaceuticals to compensate for breakage of the glass containers. This is a wasteful practice which is alleviated by the present invention. The glass containers are cushioned and protected by the padding in the trays.

The modular arrangement of the operating subassemblies, such as the battery module, electronics module, and heat exchanger module, serve to allow the storage device to be quickly and easily repaired and put back into operation. Defective control circuits can be replaced quickly, as can weak battery packs, or detective thermocouple heat exchanger units.

Another aspect of the present invention is the protection of photosensitive pharmaceuticals from sunlight and other types of damaging light. Most, if not all, of the temperature sensitive pharmaceuticals carried by paramedics are also sensitive to light. If exposed to light, the pharmaceuticals will undergo chemical alteration, lose potency or will have a diminished shelf life. The present invention maintains the pharmaceuticals in a light free enclosure. The base 13 and cover 15 are opaque to light.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. A temperature-controlled pharmaceutical storage apparatus for containing temperature sensitive pharmaceutical substances which must be maintained within a range of temperatures to avoid diminishment of potency or shelf life, comprising:
   a) a substantially enclosed and thermally insulated structure, having at least one port which opens to allow access to an enclosed storage area having a storage temperature;
   b) means for selectively heating and cooling said storage area of said substantially enclosed and thermally insulated structure;
   c) means for detecting elevation of said storage temperature above a selected maximum storage temperature, and for actuating said means for selectively heating and cooling to lower said storage temperature below said selected maximum storage temperature;
   d) means for detecting lowering of said temperature below a selected minimum temperature, and actuating said means for selectively heating and cooling to raise said storage temperature above said selected minimum temperature;
   e) means for detecting and indicating a first alarm condition when said storage temperature rises above said maximum storage temperature to a first selected critical temperature which would impair the potency of temperature sensitive pharmaceutical substances stored within said storage area, said means for detecting and indicating a first alarm condition further comprising means for maintaining an alarm indication regardless of any subsequent changes in said storage temperature;
   f) means for detecting and indicating a second alarm condition when said storage temperature falls below a minimum storage temperature to a second selected critical temperature which would impair the potency of temperature sensitive pharmaceutical substances stored within said storage area, said means for detecting and indicating a second alarm condition further comprising means for maintaining an alarm indication regardless of any subsequent changes in said storage temperature;
   g) wherein said maximum storage temperature constitutes an upper temperature level above which potency of said temperature sensitive pharmaceutical substances may be impaired, and wherein said minimum storage temperature constitutes a lower temperature level below which potency of said temperature sensitive pharmaceutical substances may be impaired.

2. A temperature-controlled pharmaceutical storage apparatus according to claim 1, further comprising an override means for disabling said means for cooling and said means for heating when said at least one port is open.

3. A temperature-controlled pharmaceutical storage apparatus according to claim 1, further comprising at least one rechargeable battery for powering said means for cooling and said means for heating.

4. A temperature-controlled pharmaceutical storage apparatus according to claim 1, wherein said selected maximum storage temperature is approximately 86 degrees Fahrenheit, and wherein said minimum storage temperature is approximately 59 degrees Fahrenheit to maintain said storage temperature within a range of pharmaceuticals which do not adversely affect the potency of most temperature sensitive temperature substances.

5. A temperature-controlled pharmaceutical storage apparatus according to claim 1, wherein said selected maximum storage temperature, and said selected minimum storage temperature are preset at fixed temperature values.

6. A temperature-controlled pharmaceutical storage apparatus for controlling temperature sensitive pharmaceutical substances which must be maintained within a range of temperatures to avoid diminishment of potency or shelf life, comprising:
   a) a substantially enclosed and thermally insulated structure, having at least one port which opens to allow access to an enclosed storage area having a storage temperature;
   b) a thermopile heat exchange means for cooling said enclosed storage area when operated in a cooling mode, and for heating said enclosed area when operated in a heating mode;
   c) a temperature sensor for continually monitoring said storage temperature;
   d) detector means for detecting when said storage temperature is outside of a predetermined range of temperatures, said detector means being connected to said temperature sensor and to said thermopile heat exchanger means, said detector means operating said thermopile heat exchanger means when said storage temperature is outside of said predetermined range to bring said storage temperature within said predetermined range;
   e) at least one battery for powering said thermocouple heat exchange means;
   f) override means for disabling said thermopile heat exchange means when said at least one port is open, for preserving said at least one battery.

7. A temperature-controlled pharmaceutical storage apparatus for controlling temperature sensitive pharmaceutical substances according to claim 6, wherein said thermopile heat exchange means comprises a modular unit which releasably couples to said substantially enclosed and thermally insulated structure.

8. A temperature-controlled pharmaceutical storage apparatus for controlling temperature sensitive pharmaceutical substances according to claim 6, further comprising:
   a) a modular battery pack including said at least one battery, which releasably couples to said substantially enclosed and thermally insulated structure.

9. A temperature-controlled pharmaceutical storage apparatus for controlling temperature sensitive pharmaceutical substances according to claim 6, further comprising:
   a) means for indicating that said at least one battery requires recharging;
   b) means for recharging said at least one battery.

10. A temperature-controlled pharmaceutical storage apparatus for controlling temperature sensitive pharmaceutical substances which must be maintained within a range of temperatures to avoid diminishment of potency or shelf life, comprising:
   a) a substantially enclosed and thermally insulated structure, including:
      i) a substantially rectangular base, having upper and lower regions;
      ii) a divider plate disposed in said substantially rectangular base, separating said upper region from said lower region, and having a plurality of drainage ports;
      iii) a desiccant means for absorbing moisture, disposed in said lower region;
      iv) a cover for enclosing said substantially rectangular base;
      v) wherein said upper region serves as a storage area having a storage temperature, and said lower region services as a drainage bin for condensate;
   b) a thermopile heat exchange means for cooling said enclosed storage area when operated in a cooling mode, and for heating said enclosed area when operated in a heating mode;
   c) a temperature sensor for continually monitoring said storage temperature;
   d) detector means for detecting when said storage temperature is outside of a predetermined range of temperatures, said detector means being connected to said temperature sensor and to said thermopile heat exchanger means, said detector means operating said thermopile heat exchanger means when said storage temperature is outside of said predetermined range to bring said storage temperature within said predetermined range;
   e) at least one battery for powering said thermopile heat exchange means;
   f) override means for disabling said thermopile heat exchange means when said at least one port is open, for preserving said at least one battery.

11. A device for storing pharmaceuticals within a predetermined temperature range, comprising:
   a) a container having top, bottom and side walls that form an interior compartment, said walls having thermal insulation therein, said top wall being capable of being opened so as to allow access into said interior compartment;
   b) temperature sensor means for sensing the temperature of said interior compartment, said temperature sensor means being located within said interior compartment;
   c) window detector means for detecting temperatures that are cooler than 59 degrees Fahrenheit and warmer than 86 degrees Fahrenheit, said window detector means having an input that is connected to said temperature sensor means;
   d) thermopile means for heating and cooling said interior compartment, said thermopile means being located in said container and being thermally coupled to said interior compartment and to the exterior of said container;
   e) switch means for selectively operating said thermopile means in a heating mode wherein said interior compartment is heated or in a cooling mode wherein said interior compartment is cooled, said switch means being coupled to an output of said window detector means and to said thermopile means, wherein when said window detector means and said temperature sensor means detect the temperature of said interior compartment as being below 59 degrees Fahrenheit, then said switch means operates said thermopile means to heat said interior compartment and when said window detector means and said temperature sensor means detect the temperature of said interior compartment as being above 86 degrees Fahrenheit, then said switch means operates said thermopile means to cool said interior compartment.

12. The device of claim 11, further comprising alarm indicator means, said alarm indicator means being coupled to a second output of said window detector means, said alarm indicator means being programmed with a predetermined time delay, wherein when said window detector means detects a temperature outside of the 59–86 degree Fahrenheit range, for said predetermined time delay, said alarm indicator means provides and maintains an indication of the temperature excess.

13. A device for storing pharmaceuticals within a predetermined temperature range, comprising:
   a) a container having top, bottom and side walls that form an interior compartment, said walls having thermal insulation therein, said top wall being capable of being opened so as to allow access into said interior compartment;
   b) temperature sensor means for sensing the temperature of said interior compartment, said temperature sensor means being located within said interior compartment;
   c) window detector means for detecting temperatures that are cooler than a predetermined minimum temperature and warmer than a predetermined maximum temperature, said window detector means having an input that is connected to said temperature sensor means;
   d) thermopile means for heating and cooling said interior compartment, said thermopile means being located in said container and being thermally coupled to said interior compartment and to the exterior of said container;
   e) switch means for selectively operating said thermopile means in a heating mode wherein said interior compartment is heated or in a cooling mode wherein said interior compartment is cooled, said switch means being coupled to an output of said window detector means and to said thermopile means, wherein when said window detector means and said temperature sensor means detects the temperature of said interior compartment as being below said predetermined minimum temperature, then said switch means operates said temperature means to heat said interior compartment and when said window detector means and said temperature sensor means detect the temperature of said interior compartment as being above said predetermined maximum temperature, then said switch means operates said thermopile means to cool said interior compartment;
   f) alarm indicator means being coupled to a second output of said window detector means, said alarm indicator means being programmed with a predetermined time delay, wherein when said window detector means detects a temperature outside of the predetermined minimum temperature to predetermined maximum temperature range for said predetermined time delay, said alarm indicator means provides and maintains an indication of the temperature excess.

14. The device of claim 13 wherein:
   a) said alarm indictor means has a reset input wherein when said reset input is triggered, said alarm indicator means changes from an alarm mode to a non-alarm mode, said alarm mode providing said indication of the temperature excess;
   b) said device further comprising security means for restricting unauthorized access to said reset input, said reset input being coupled to said security means.

15. The device of claim 13 further comprising trays for holding said pharmaceuticals, said trays being padded so as to reduce breakage of pharmaceuticals containers located in said trays.

16. The device of claim 13 further comprising a first battery for powering said thermopile means and said alarm indicator means and a backup battery for powering said alarm indicator means in the event that said first battery fails.

17. The device of claim 13 further comprising cutoff switch means for disabling said thermopile means when said top wall is opened, said cutoff switch means being located in said container adjacent to said top wall so as to be actuated by the opening of said top wall.

18. The device of claim 13 wherein said interior compartment has a divider plate that separates said interior compartment into upper and lower chambers, said upper chamber being adapted to receive said pharmaceuticals and said lower chamber receiving a desiccant material, said divider plate being perforated so as to allow moisture to pass therethrough.

19. The device of claim 13 wherein said thermopile means and said window detector means are contained in at least one module, said module being separable from said container so as to allow the replacement of said module.

20. The device of claim 13, further comprising:
   a) trays for holding said pharmaceuticals, said trays being padded so as to reduce breakage of pharmaceuticals containers located in said trays;
   b) a first battery for powering said thermopile means and said alarm indicator means and a backup battery for powering said alarm indicator means in the event that said first battery fails;
   c) said alarm indictor means has a reset input wherein when said reset input is triggered, said alarm indicator means changes from an alarm mode to a non-alarm mode, said alarm mode providing said indication of the temperature excess, said device further comprising security means for restricting unauthorized access to said reset input, said reset input being coupled to said security means.

21. The device of claim 20, further comprising:
   a) cutoff switch means for disabling said thermopile means when said top wall is opened, said cutoff switch means being located in said container adjacent to said top wall so as to be actuated by the opening of said top wall;
   b) said interior compartment has a divider plate that separates said interior compartment into upper and lower chambers, said upper chamber being adapted to receive said pharmaceuticals and said lower chamber receiving a desiccant material, said divider plate being perforated so as to allow moisture to pass therethrough;
   c) said thermopile means and said window detector means are contained in at least one module, said module being separable from said container so as to allow the replacement of said module.

* * * * *